US011436390B2

United States Patent
Blom-Schieber et al.

(10) Patent No.: US 11,436,390 B2
(45) Date of Patent: Sep. 6, 2022

(54) FIBER PATH PLANNING TO REDUCE IN-PLANE CURVATURE

(71) Applicant: THE BOEING COMPANY, Chicago, IL (US)

(72) Inventors: Adriana Willempje Blom-Schieber, Shoreline, WA (US); Troy Winfree, Seattle, WA (US); Jeffrey David Poskin, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 135 days.

(21) Appl. No.: 16/904,954

(22) Filed: Jun. 18, 2020

(65) Prior Publication Data
US 2021/0397761 A1    Dec. 23, 2021

(51) Int. Cl.
*G06G 7/48*  (2006.01)
*G06F 30/15*  (2020.01)
(Continued)

(52) U.S. Cl.
CPC ............ *G06F 30/15* (2020.01); *B29C 70/382* (2013.01); *G06T 17/10* (2013.01); *G06T 17/30* (2013.01)

(58) Field of Classification Search
CPC ...... G06F 30/15; G06F 2113/26; G06F 30/17; G06F 30/20; B29C 70/382; G06T 17/30; G06T 17/10
See application file for complete search history.

(56) References Cited

U.S. PATENT DOCUMENTS 9,545,759 B2  1/2017 Yarker et al.
10,549,491 B2  2/2020 Blom-Schieber et al.
(Continued)

FOREIGN PATENT DOCUMENTS

EP  3078471 A1  10/2016
EP  2749869 B1  4/2019

OTHER PUBLICATIONS

Blom, A.W., "Structural Performance of Fiber-Placed, Variable-Stiffness Composite Conical and Cylindrical Shells," Wohrmann Print Service, Zutphen, The Netherlands, 2010, pp. 264.
(Continued)

*Primary Examiner* — Rehana Perveen
*Assistant Examiner* — Nithya J. Moll
(74) *Attorney, Agent, or Firm* — Moore IP Law (57) ABSTRACT

A method of planning fiber paths for a composite ply of a composite layup includes determining a first unit vector field. The first unit vector field represents a first approximation of target directions to be followed by tow centerlines of the composite ply. The first unit vector field is determined based on a specified rosette direction, a surface approximation of a nonplanar contoured surface of an object to be formed, and a fiber angle distribution. The method also includes determining, based on specified angle deviation bounds and the first unit vector field, a second unit vector field. The second unit vector field represents a second approximation of the target directions. The second approximation has reduced in-plane curvature relative to the first approximation. The method further includes planning a fiber placement head path for forming the composite ply of the composite layup based on the second unit vector field.

20 Claims, 6 Drawing Sheets

(51) Int. Cl.
    *B29C 70/38*    (2006.01)
    *G06T 17/10*    (2006.01)
    *G06T 17/30*    (2006.01)

(56) References Cited

U.S. PATENT DOCUMENTS

| | | | |
|---|---|---|---|
| 10,654,228 | B2 | 5/2020 | Drumheller |
| 10,670,394 | B2 | 6/2020 | Winfree et al. |
| 2007/0187024 | A1 | 8/2007 | Johnson et al. |
| 2009/0148647 | A1 | 6/2009 | Jones et al. |
| 2009/0321985 | A1 | 12/2009 | Aguado et al. |
| 2014/0177936 | A1 | 6/2014 | Toledano |
| 2014/0288893 | A1* | 9/2014 | Blom .................... G06F 30/00 703/1 |
| 2014/0330420 | A1 | 11/2014 | MacLean |
| 2016/0063137 | A1* | 3/2016 | Flory .................... G06F 30/23 703/1 |
| 2016/0082672 | A1* | 3/2016 | Munaux ............. G05B 19/4097 156/230 |
| 2016/0121557 | A1* | 5/2016 | Munaux ................ B29C 70/382 700/98 |
| 2016/0121558 | A1* | 5/2016 | Munaux ................ B29C 70/382 700/97 |
| 2016/0221271 | A1 | 8/2016 | Yarker et al. |
| 2018/0372488 | A1* | 12/2018 | Winfree ............... B29C 70/382 |
| 2019/0070800 | A1* | 3/2019 | Blom-Schieber ..... B29C 70/382 |
| 2019/0389150 | A1* | 12/2019 | Louie ................... B29C 70/382 |

OTHER PUBLICATIONS

De Goes, Fernando et al., "Vector Field Processing of Triangle Meshes," SA '15: SIGGRAPH Asia 2015 Courses, Nov. 2015, Article No. 17, https://doi.org/10.1145/2818143.2818167, pp. 1-48.
CGTECH, "Programming & Simulation Software for Automated Fiber Placement (AFP) & Tape Laying (ATL)", Vericut Composite Applications Brochure, accessed Apr. 4, 2017, 3 pages.<http://www.cgtech.com/wp-content/uploads/resources/brochures/VERICUT_Composite_Brochure.pdf.
European Search Report for Application No. 18182259.4 dated Dec. 17, 2018, 6 pgs.
Hasenjaeger, "Programming and Simulating Automated Fiber Placement (AFP) CNC Machines", SAMPE Journal, Nov./Dec. 2013, vol. 49, No. 6, 8 pages.

* cited by examiner

502 — Determine a value of a curvature metric represented by a weighted average in-plane rotation for adjacent pairs of planar surface elements 504 — Repeatedly modify one or more unit vectors of the first unit vector field and determine modified values of the curvature metric, where the second unit vector field corresponds to a modified first unit vector field having a lowest identified value among the modified values of the curvature metric

602 — Determine a 2D projection of unit vectors of a pair of adjacent planar surface elements 604 — Determine a set of intersection angles including a pair of intersection angles for each pair of adjacent planar surface elements, each intersection angle indicating an angle between a unit vector of one of the adjacent planar surface elements and an edge shared by the adjacent planar surface elements 606 — Determine weighting values for calculating the curvature metric based on the set of intersection angles

FIBER PATH PLANNING TO REDUCE IN-PLANE CURVATURE

FIELD OF THE DISCLOSURE

The present disclosure is generally related to fiber path planning for automated fiber placement manufacturing processes.

BACKGROUND

Advanced (or automated) fiber placement (AFP) refers to automation of some steps of a process of manufacturing fiber reinforced polymer laminates. Generally, AFP manufacturing uses one or more automated fiber placement machines to build a composite layup, layer-by-layer. Each layer (or ply) typically includes multiple courses, and each course typically includes multiple tows of resin impregnated or dry fiber material. Material properties of composite layups formed in this way vary based on the orientation angle of the fibers. To illustrate, a part may have a greater tensile strength along a direction parallel to the fibers than the tensile strength along a direction perpendicular to the fibers. Thus, for some applications, it may be important for a part manufactured using AFP to have fibers that are oriented in a particular manner specified during design.

Constraints associated with AFP manufacturing place certain limitations on manufacturing composite layups with complex shapes while maintaining specified fiber angle orientations. For example, for some composite layups, a tow may need to change directions (e.g., turn) one or more times to keep the fibers aligned with the as-designed fiber orientation; however, such turns can inhibit cohesion of the tow to the underlying surface, resulting in folds, puckers, or other flaws. Some fiber placement and orientation concerns can be addressed by using fewer and smaller tows; however, using fewer or smaller tows increases manufacturing time since the number of courses to cover the same area increases, taking longer to build up each layer.

SUMMARY

In a particular implementation, a system for planning fiber paths for a composite ply of a composite layup includes one or more processors and one or more memory devices. The one or more memory devices store instructions that are executable by the one or more processors to cause the one or more processors to perform operations including determining a first unit vector field representing a first approximation of target directions to be followed by tow centerlines of the composite ply. The first unit vector field is determined based on a specified rosette direction, a surface approximation of a nonplanar contoured surface of an object to be formed via the composite layup, and a fiber angle distribution. The operations also include determining, based on specified angle deviation bounds and the first unit vector field, a second unit vector field representing a second approximation of the target directions. The second approximation has reduced in-plane curvature relative to the first approximation. The operations further include planning a fiber placement head path for forming the composite ply of the composite layup based on the second unit vector field.

In another particular implementation, a method of planning fiber paths for a composite ply of a composite layup includes determining, by one or more processors, a first unit vector field representing a first approximation of target directions to be followed by tow centerlines of the composite ply. The first unit vector field is determined based on a specified rosette direction, a surface approximation of a nonplanar contoured surface of an object to be formed via the composite layup, and a fiber angle distribution. The method also includes determining, by the one or more processors based on specified angle deviation bounds and the first unit vector field, a second unit vector field representing a second approximation of the target directions. The second approximation has reduced in-plane curvature relative to the first approximation. The method further includes planning, by the one or more processors, a fiber placement head path for forming the composite ply of the composite layup based on the second unit vector field.

In another particular implementation, a computer-readable storage device stores instructions that, when executed by one or more processors, cause the one or more processors to initiate, perform, or control operations including determining a first unit vector field representing a first approximation of target directions to be followed by tow centerlines of a composite ply. The first unit vector field is determined based on a specified rosette direction, a surface approximation of a nonplanar contoured surface of an object to be formed via a composite layup, and a fiber angle distribution. The operations also include determining, based on specified angle deviation bounds and the first unit vector field, a second unit vector field representing a second approximation of the target directions. The second approximation has reduced in-plane curvature relative to the first approximation. The operations further include planning a fiber placement head path for forming the composite ply of the composite layup based on the second unit vector field.

The features, functions, and advantages described herein can be achieved independently in various implementations or may be combined in yet other implementations, further details of which can be found with reference to the following description and drawings.

DETAILED DESCRIPTION

Aspects disclosed herein present systems and methods for planning fiber paths for manufacturing a composite ply of a composite layup using AFP. The fiber path planning operations disclosed reduce in-plane curvature of tows, which reduces the occurrence of AFP defects, such as poor compaction, wrinkles, and excessive gaps or overlaps. The fiber path planning operations disclosed may also reduce demand for manual rework and increase fiber lay down speed, which reduces overall manufacturing time and corresponding cost for parts made using AFP.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. Common features are designated by common reference numbers throughout the drawings and description. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2, multiple planar surface elements are illustrated and associated with reference numbers 128A and 128B. When referring to a particular one of these planar surface elements, such as the planar surface elements 128A, the distinguishing letter "A" is used. However, when referring to any arbitrary one of these planar surface elements or to these planar surface elements as a group, the reference number 128 is used without a distinguishing letter.

Figure 1:
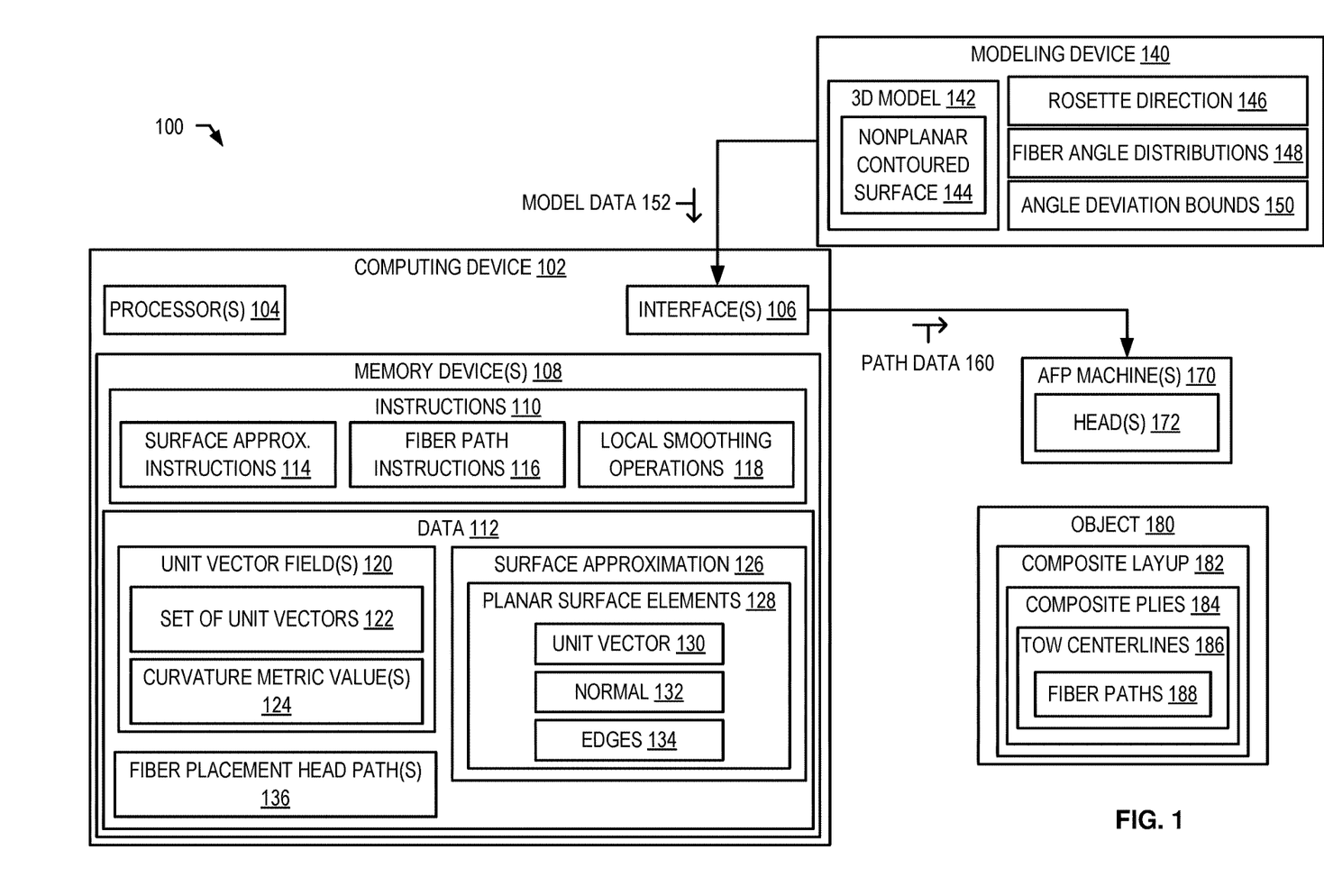
FIG. 1 is a block diagram that illustrates an example of a system configured to plan fiber paths for composite plies of a composite layup according to a particular implementation.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a computing device 102 that includes one or more processors ("processor(s)" 104 in FIG. 1), which indicates that in some implementations the computing device 102 includes a single processor 104 and in other implementations the computing device 102 includes multiple processors 104. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a block diagram that illustrates an example of a system 100 that includes a modeling device 140, a computing device 102, and one or more automated fiber placement (AFP) machines 170. The modeling device 140 and the computing device 102 are used during design of an object 180 that is to be manufactured using the AFP machine 170. In other implementations, the system 100 includes more devices, fewer devices, or different devices. For example, in some implementations, the modeling device 140 and the computing device 102 are combined in a single tool. As another example, in some implementations, the system 100 includes more than one computing device 102, more than one modeling device 140, or both.

The computing device 102 includes one or more processors 104, one or more memory devices 108, and one or more interfaces 106. In some implementations, the computing device 102 also, or alternatively, includes other hardware, such as an application-specific integrated circuit (ASIC) or a field-programmable gate array (FPGA), to perform the functions described below. The memory device 108 includes one or more volatile memory devices (e.g., random access memory (RAM) devices), one or more nonvolatile memory devices (e.g., read-only memory (ROM) devices, programmable read-only memory, and flash memory), or both. Each memory device 108 includes or corresponds to a non-transitory, computer-readable storage device (i.e., is not merely a signal). The processor 104 is configured to execute software instructions 110 to perform various operations. Although specific instructions 110 are described below, the memory device 108 may also store data 112 (e.g., program data) and other instructions, such as an operating system and other programs. Further, the computing device 102 can include other hardware, such as input/output interfaces, input/output device, etc.

Although the details of the modeling device 140 are not shown in FIG. 1, the modeling device 140 also includes one or more processors, one or more memory devices, and other hardware or circuitry. The processor of the modeling device 140 is configured to execute 3D modeling software to design, manipulate, and/or modify a 3D model 142 of the object 180. For example, the 3D modeling software enables a user to render the 3D model 142 for visualization purposes and enables the user to edit or revise aspects of the design of the object 180. In some implementations, the modeling device 140 is also configured to execute instructions to analyze properties of the object 180 based on the 3D model 142. For example, the modeling device 140 estimates mechanical properties of the object 180 based on a geometry of the object 180 and as-designed material properties, such as a rosette direction 146, fiber angle distributions 148, angle deviation bounds 150, and other characteristics or parameters associated with the composite layup 182.

As used herein, the rosette direction 146 indicates a reference direction of the 3D model 142 or the object 180. A fiber angle distribution 148 indicates a nominal fiber orientation, relative to the rosette direction 146, for a ply. For example, a composite layup 182 includes multiple composite plies 184 (also referred to as "plies"), and the plies typically have different nominal fiber orientations indicated by an angle relative to the rosette direction 146. To illustrate, the composite layup 182 may include one or more 0 degree plies 184 in which the nominal fiber angle of tows is parallel to the rosette direction 146, may include one or more 45 degree plies 184 in which the nominal fiber angle of tows is angularly offset by 45 degrees relative to the rosette direction 146, and may include one or more 90 degree plies 184 in which the nominal fiber angle of tows is angularly offset by 90 degrees relative to the rosette direction 146. Although the example above illustrates three nominal fiber angles that can be indicated by the fiber angle distribution 148, in other implementations, the fiber angle distribution indicates more than three nominal fiber angles (one per ply 184). Also, although the example above refers to a single rosette direction 146, in some implementations, such as very complex objects 180, multiple rosette directions 146 are specified.

The AFP machine 170 includes one or more fiber placement heads 172 and other components to enable the AFP machine 170 to build up multiple layers of fiber reinforced polymer material to form the object 180. Each head 172 is coupled to a steering mechanism that is configured to move the head 172 to direct application of one or more tows to form a course (e.g., a set of tows applied in a single pass). The steering mechanisms include, for example, robotic arms, gantries, movable platforms, or other devices to move the head 172 of the AFP machine 170.

When complete, the object 180 includes or corresponds to the composite layup 182 formed of or including the plurality of composite plies 184. Each composite ply 184 includes multiple tows arranged along respective tow centerlines 186. The tow centerlines 186 define fiber paths 188. An angle between a fiber path 188 and a target fiber path is referred to as a fiber angle deviation. To illustrate, in a 90 degree ply, one or more tows may include portions in which the fibers are oriented at 92 degrees relative to the rosette direction 146, which corresponds to a 2 degree fiber angle deviation from the nominal 90 degree orientation of the fibers of the ply. The composite plies 184 have anisotropic material properties that vary relative to the fiber directions. To illustrate, mechanical properties measured along the fiber directions of a particular composite ply 184 are generally greater than the same mechanical properties measured across the fiber directions of the particular composite ply 184.

The head 172 of the AFP machine 170 can dispense each tow independently, thereby enabling a certain amount of in-plane steering of the course by allowing the tows on the outside of a turn to be paid out faster than the tows on the inside of a turn. The lack of differential material pay out within a tow introduces stresses within the material during steering, which can result in the tow folding over if the tension is too high, or puckers or wrinkles forming if the compression is too high. For a given in-plane steering radius, the stresses in wider tows are higher than those in narrower tows, making them more susceptible to puckering or wrinkling.

The modeling device 140 generates model data 152 based on the 3D model 142, the rosette direction 146, the fiber angle distributions 148, the angle deviation bounds 150, other data descriptive of the as-designed object 180, or a combination thereof. The model data 152 is provided to the computing device 102 for fiber path planning or optimization.

In the example illustrated in FIG. 1, the computing device 102 executes surface approximation instructions 114 to generate one or more surface approximations 126 of surface(s) of the 3D model 142, such as the nonplanar contoured surface 144. In other implementations, the modeling device 140 executes the surface approximation instructions 114, and the surface approximations 126 are represented in the model data 152. Each surface approximation 126 includes a plurality of planar surface elements 128, such as polygons. For example, the nonplanar contoured surface 144 can be approximated by a plurality of triangles or other polygons, each of which approximates a portion of the nonplanar contoured surface 144. Each planar surface element 128 is characterized by a set of nodes (e.g., vertices) joined by edges 134 (e.g., sides) and a normal vector ("normal" 132 in FIG. 1). In some implementations, one or more of the nodes, one or more of the edges, or a plane defined by the nodes and edges lie on or are tangent to the portion of the nonplanar contoured surface 144. In a particular implementation, each composite ply 184 of the object 180 is represented by a corresponding surface approximation 126.

The processor 104 of the computing device 102 also executes fiber path instructions 116 to generate a unit vector field 120 representing the fiber paths 188 and to modify or update the unit vector field 120 to reduce in-plane curvature of the planned fiber paths 188. Each unit vector field 120 includes a set of unit vectors 122 including one unit vector 130 per planar surface element 128, as illustrated in further detail in FIG. 2. The unit vector 130 of a particular planar surface element 128 represents the fiber direction in the particular planar surface element 128. In a particular implementation, the unit vectors 130 are modified or updated by the processor 104 responsive to execution of the fiber path instructions 116, local smoothing operations 118, or both, to generate fiber placement head paths 136 used to form the object 180.

To illustrate, in a particular implementation, a first unit vector field 120 is generated based on the specified rosette direction and rotations of the unit vectors 130 around respective normals 132 based on the fiber angle distribution 148. In this implementation, the first unit vector field 120 is updated or modified, based on curvature metric values 124 to generate a second unit vector field 120' representing reduced in-plane curvature of the planned fiber paths 188. Subsequently, in this implementation, the second unit vector field 120' is modified or further refined by the local smoothing operations 118 to generate a third unit vector field 120. In this implementation, the third unit vector field 120" is used to generate the fiber placement head paths 136. Modifying the planned fiber paths 188 to reduce in-plane curvature reduces the occurrence of AFP defects, such as poor compaction and wrinkles, which results in reduced demand for manual rework and increased fiber lay down speed. Accordingly, modifying the fiber paths to reduce in-plane curvature leads to reduced overall manufacturing time and reduced cost for manufacturing parts using AFP.

The fiber placement head paths 136 are used to generate path data 160, which is provided to the AFP machine 170. In a particular implementation, the path data 160 include machine instructions that are executable by a controller of the AFP machine 170 to generate commands and/or control signals that cause actuators or other mechanism of the AFP machine 170 to manufacture the object 180. As an example, the path data 160 include G-code instructions or other numerical control instructions for the AFP machine 170.

Figure 2:
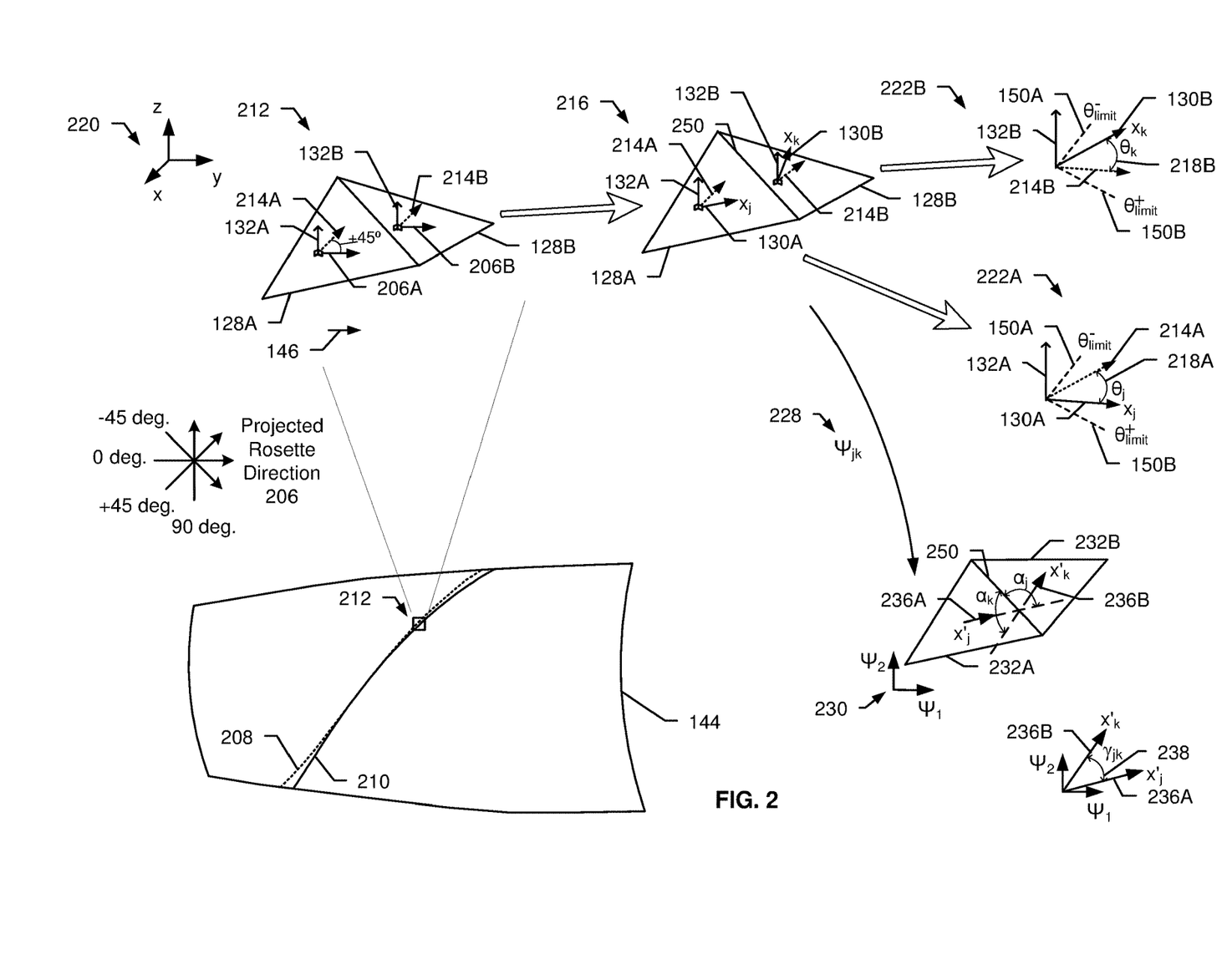
FIG. 2 is a diagram that illustrates aspects of planning fiber paths according to a particular implementation.

FIG. 2 is a diagram that illustrates aspects of planning the fiber paths 188 of FIG. 1 according to a particular implementation. In particular, FIG. 2 illustrates an example of the nonplanar contoured surface 144 of the object 180 of FIG. 1. FIG. 2 also illustrates the rosette direction 146, which in the example illustrated in FIG. 2 is parallel to a 0 degree direction. FIG. 2 also illustrates examples of nominal angles associated with the fiber angle distribution 148, which in FIG. 2 include the 0 degree direction, a positive (+) 45 degree direction, a 90 degree direction, and a negative (−) 45 degree direction. In other examples, the fiber angle distribution 148 may include more, fewer, or different nominal fiber orientations, such as a positive (+) 60 degree direction, a negative (−) 60 degree direction, or another angular offset from the rosette direction.

FIG. 2 illustrates an example of a target fiber direction 208 on the nonplanar contoured surface 144. For reference, FIG. 2 also illustrates a geodesic path 210 on the nonplanar contoured surface 144. The geodesic path 210 is a path that the AFP head 172 can naturally follow without any steering. Thus, following the geodesic path 210 does not require any in-plane curvature of the fibers. However, fibers oriented along the geodesic path 210 exhibit fiber angle deviation from the target fiber direction 208, and the target fiber direction 208 deviates from the geodesic path 210. The AFP machine 170 may be able to follow the target fiber direction 208 by steering the tow centerlines 186 as the tows are applied; however, such steering introduces in-plane curvature of the fibers.

A detailed view 212 in FIG. 2 illustrates aspects of the surface approximation 126 of the nonplanar contoured surface 144. The detailed view 212 shows a plurality of planar surface elements 128, including a first planar surface element 128A and a second planar surface element 128B. In a particular aspect, each of the planar surface elements 128 approximates a respective portion of the nonplanar contoured surface 144. The planar surface elements 128 are defined by nodes (e.g., vertices of a polygon) joined by edges (e.g., sides of the polygon). A pair of adjacent planar surface elements 128 share an edge (such as shared edge 250). Each planar surface element 128 has a normal 132, which is a unit vector extending along a direction perpendicular to the planar surface element 128. For example, if the first planar surface element 128A resides in an X-Y plane defined by axes 220, then a normal 132A of the first planar surface element 128A extends parallel to the Z-axis.

A unit vector field 120 representing the rosette direction 146 is generated by projecting a unit vector 206 onto each planar surface element 128. The set of such projected unit vectors 206 forms an initial unit vector field 120. For example, in FIG. 2, the unit vector 206A represents the rosette direction 146 projected on the first planar surface element 128A, and the unit vector 206B represents the rosette direction 146 projected on the second planar surface element 128B.

A unit vector 214 is determined for each planar surface element 128 by rotating the corresponding unit vector 206 around the respective normal 132 of the planar surface element 128 by an angle indicated by the fiber angle distribution 148 to generate a first unit vector field representing the target fiber direction 208. For example, in FIG. 2, the target fiber direction 208 corresponds to a nominal fiber orientation of positive (+) 45 degrees relative to the rosette direction 146. In this example, the unit vector 206A is rotated around the normal 132A (e.g., in plane with the first planar surface element 128A) to generate the unit vector 214A representing a projection of the target fiber direction 208 on the first planar surface element 128A. Likewise, the unit vector 206B is rotated around the normal 132B (e.g., in plane with the second planar surface element 128B) to generate the unit vector 214B representing a projection of the target fiber direction 208 on the second planar surface element 128B. Note that due to curvature of the nonplanar contoured surface 144, the normals 132 are not necessarily parallel to one another and the unit vector 214A and the unit vector 214B may not be parallel to one another.

A second detail view 216 illustrates an example of modifying the first unit vector field representing the target fiber direction 208 to generate a second unit vector field 120' with reduced in-plane curvature. The second unit vector field 120' includes a set of unit vectors 130, such as unit vector 130A of the first planar surface element 128A and unit vector 130B of the second planar surface element 128B as illustrated in FIG. 2. One or more of the unit vectors 130 is rotated about the respective normal 132 of the planar surface element 128 from the direction indicated by the target fiber direction 208. FIG. 2 illustrates detailed and exaggerated views 222A and 222B of the vectors 132, 214, 130 of the first planar surface element 128A and the second planar surface element 128B to show the rotation of the unit vectors 130.

In the example illustrated in view 222A, the unit vector 130A (also denoted as vector $x_j$) is rotated clockwise (in the orientation illustrated) from the direction of the unit vector 214A by an angle 218A (also denoted as angle $\theta_j$). The amount that the unit vector 130A is allowed to rotate with respect to the unit vector 214A is limited by angle deviation bounds 150, which in FIG. 2 includes a positive angle deviation bound 150B and a negative angle deviation bound 150A (also denoted as $\theta^+_{limit}$ and $\theta^-_{limit}$, respectively).

In the example illustrated in view 222B, the unit vector 130B (also denoted as vector $x_k$) is rotated counterclockwise (in the orientation illustrated) from the direction of the unit vector 214B by an angle 218B (also denoted as angle $\theta_k$). The amount that the unit vector 130B is allowed to rotate with respect to the unit vector 214B is limited by angle deviation bounds 150.

As illustrated in FIG. 2, the planar surface elements 128 can be subjected to a transform operation 228 to convert the planar surface elements 128 from a 3D space (represented by axes 220) to elements 232 in a two-dimensional (2D) space (represented by axes 230). Each element 232 in the 2D space has a corresponding transformed unit vector 236, which represents a 2D transformed version of the unit vector 130 from the respective planar surface element 128 of the 3D space. To illustrate, a first element 232A of the 2D space has a transformed unit vector 236A (also denoted $x'_j$) which represents the unit vector 130A after the transform operation 228, and a second element 232B of the 2D space has a transformed unit vector 236B (also denoted $x'_k$) which represents the unit vector 130B after the transform operation 228.

FIG. 2 also illustrates intersection angles of the transformed unit vectors 236 with the shared edge 250. For example, the transformed unit vector 236A intersects the shared edge 250 at an angle $\alpha_j$, and the transformed unit vector 236B intersects the shared edge 250 at an angle $\alpha_k$. A difference angle 238 between the angles $\alpha_j$ and $\alpha_k$ is denoted as angle $\gamma_{jk}$.

In a particular aspect, the fiber path instructions 116 determine values of the angles illustrated in FIG. 2 and use the values of the angles to modify the first unit vector field 120 representing the projected target fiber direction 208 to reduce in-plane curvature. For example, the angles illustrated in FIG. 2 are used to determine weighted average in-plane rotation for each adjacent pair of planar surface elements 128 of the surface approximation 126. The in-plane rotation, in this context, refers to or is represented by the angles 218 by which the unit vectors 130 are rotated relative to the unit vectors 214. Weighting of the in-plane rotations is based on the intersection angles $\alpha$ of the transformed unit vectors 236 with the shared edge 250. The weighted average in-plane rotation is reduced by evaluating different rotation angles 218 for the unit vectors 130 and using rotations angles 218 that result in the smallest value of the weighted average in-plane rotation to determine the second unit vector field 120'.

As a particular example, the unit vectors 130 of the second unit vector field 120' can be determined using Function 1:

$$\min \sum_{e_{jk} \in int(E)} w_{jk} \cdot (\theta_j - \theta_k + \gamma_{jk})^2 \quad \text{Function 1}$$

where $\theta_j$ and $\theta_k$ are constrained by the angle deviation bounds 150 (e.g., $\theta^-_{limit} \leq \theta_j \leq \theta^+_{limit}$ and $\theta^-_{limit} \leq \theta_k \leq \theta^+_{limit}$). In Function 1, $e_{jk}$ refers to the edge between two adjacent planar surface elements, the set int(E) refers to the set of interior (non-boundary) edges in the discrete representation of the surface, $\theta_j$ refers to the angle 218A, $\theta_k$ refers to the angle 218B, and $\gamma_{jk}$ refers to the difference angle 238. Also in Function 1, $w_{jk}$ represents a weighting value determined based on the angles $\alpha_j$ and $\alpha_k$ of FIG. 2. In a particular implementation, the weighting value $w_{jk}$ for a pair of adjacent planar surface elements 128 can be determined using Equation 1:

$$w_{jk} = \frac{1}{2}(\sin^2(\alpha_j) + \sin^2(\alpha_k)) \quad \text{Equation 1}$$

In an alternative implementation, the weighting value $w_{jk}$ for a pair of adjacent planar surface elements 128 can be determined using Equation 2:

$$w_{jk} = \lambda + (1-\lambda)\frac{1}{2}(\sin^2(\alpha_j) + \sin^2(\alpha_k)) \quad \text{Equation 2}$$

where $\lambda$ is a tuning value having a value specified by a user or as a default. For example, $\lambda$ may have a value of about 0.05 in some implementations. In still other implementations, the weighting value $w_{jk}$ for a pair of adjacent planar surface elements 128 can be determined based on a length of the shared edge 250, or an average area of the pair of adjacent planar surface elements 128, or on a combination of the aforementioned factors.

In Function 1, $\theta_j - \theta_k + \gamma_{jk}$ is discrete approximation of the in-plane curvature across the edge $e_{jk}$ which is used as a curvature metric and $(\theta_j - \theta_k + \gamma_{jk})^2$ is a quadratic loss function. In other implementations, other forms of loss function are used, such as an absolute loss function of the form $|\theta_j - \theta_k + \gamma_{jk}|$ or a trigonometric loss function of the form $-\cos(\theta_j - \theta_k + \gamma_{jk})$. Reducing the value of $\theta_j - \theta_k + \gamma_{jk}$ (e.g., by selection of the unit vectors 130) reduces in-plane curvature of fiber paths generated based on the unit vectors.

Values of $\theta_j$ and $\theta_k$ that are associated with the minimum value of Function 1 are used as the second unit vector field 120'. In some implementations, the fiber placement head paths 136 are generated from the second unit vector field 120'. The system and/or method is configured for planning, defining or generating fiber placement head paths that provide path data to an automated fiber placement machine, where the generated fiber placement head paths are followed by a fiber placement head to form a plurality of composite plies/courses of a composite ply layup. In one example, the system is configured for planning (or generating) a first fiber placement head path 136, by integrating over the second unit vector field 120' from a first starting point on the nonplanar contoured surface 144, and at least a second fiber placement head path by integrating over the second unit vector field 120' from a second point that is selected on the nonplanar contoured surface 144 such that a distance between the first fiber placement head path and second fiber placement head path results in no gap between two adjacent composite plies/courses placed on the first fiber placement head path and second fiber placement head path. However, in some situations, the second unit vector field 120' can include areas with localized high curvature. To reduce the effects of areas with localized high curvature, the computing device 102 uses the local smoothing operations 118 to smooth out such areas.

In a particular implementation, the local smoothing operations 118 identify each pair of adjacent planar surface elements 128 with values of the curvature metric (e.g., values of $\theta_j - \theta_k + \gamma_{jk}$) that are greater than a threshold curvature. In an example, the threshold curvature is based on a largest value of the curvature metric (e.g., a largest value of $\theta_j - \theta_k + \gamma_{jk}$) among all of the adjacent planar surface elements 128 of the surface approximation 126. To illustrate, in a particular implementation, the threshold curvature is a percentage or fraction of the largest value of the curvature metric. In a particular example, the threshold curvature is 70% of the largest value of the curvature metric.

After identifying a pair of adjacent planar surface elements 128 with a curvature metric value greater than the threshold curvature, the local smoothing operations 118 average the angle deviations of the pair of adjacent planar surface elements and neighboring planar surface elements to smooth the local curvature. The local smoothing operations 118 generate a third unit vector field 120, and the fiber placement head paths 136 are generated using the third unit vector field 120. For example, the fiber placement head paths 136 can be generated by integrating over the second unit vector field 120' from a starting point on the nonplanar contoured surface 144. In this example, subsequent fiber placement head paths 136 are generated by picking a second point on the nonplanar contoured surface 144 such that a distance between the first and the second fiber placement head paths 136 is such that there is no gap between adjacent courses and minimal overlap.

Planning the fiber paths to have reduced in-plane curvature reduces the occurrence of AFP defects, which improves the reliability of parts manufactured using AFP, increases manufacturing rates of AFP machines, and decreases time and cost associated with rework and inspection.

Figure 3:
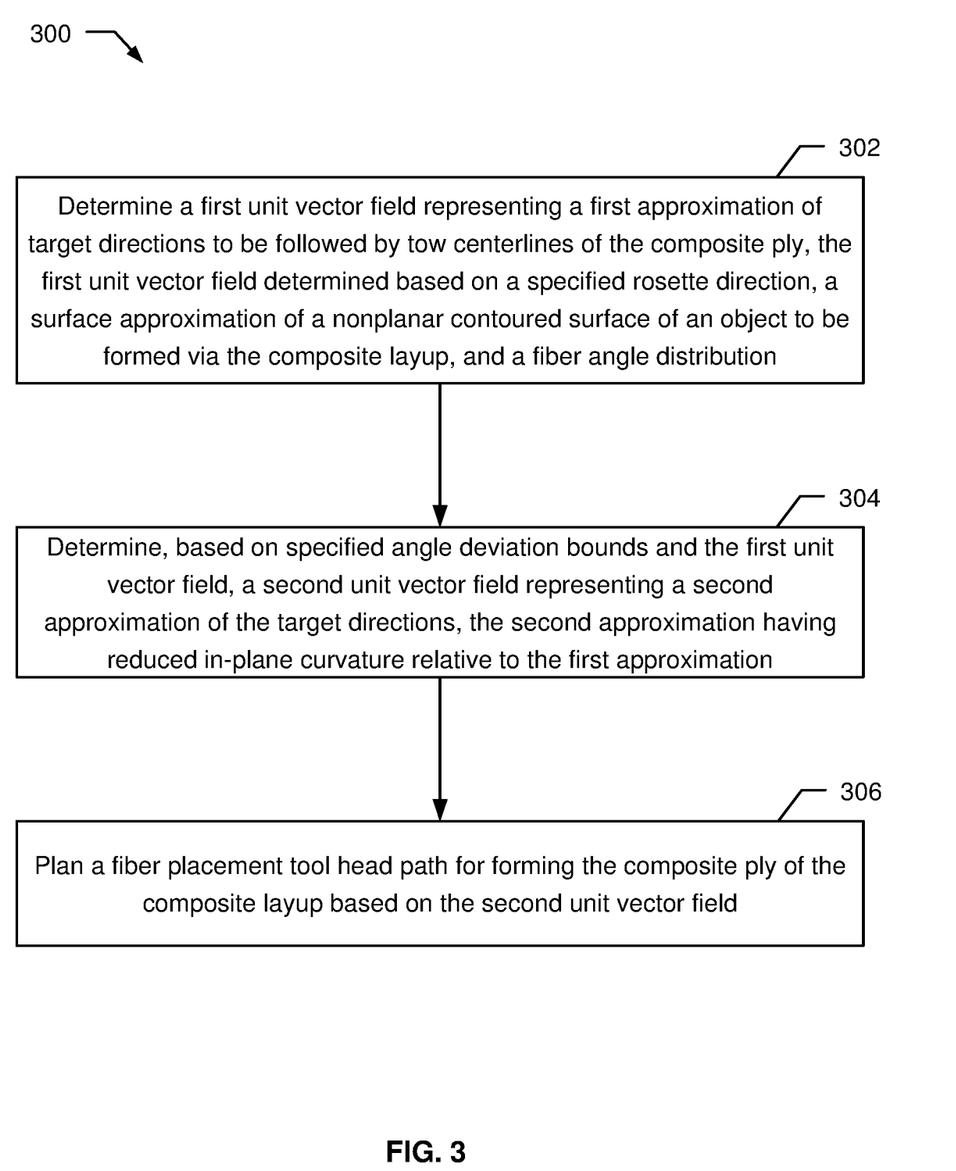
FIG. 3 is a flowchart that illustrates an example of a method of planning fiber paths for composite plies of a composite layup according to a particular implementation.

FIG. 3 is a flowchart that illustrates an example of a method 300 of planning fiber paths for composite plies of a composite layup according to a particular implementation. For example, the method 300 can be initiated, controlled, or performed by the processor 104 of the computing device 102 executing the instructions 110. FIGS. 4-7 are flowcharts of specific aspects of the method 300.

Figure 4:
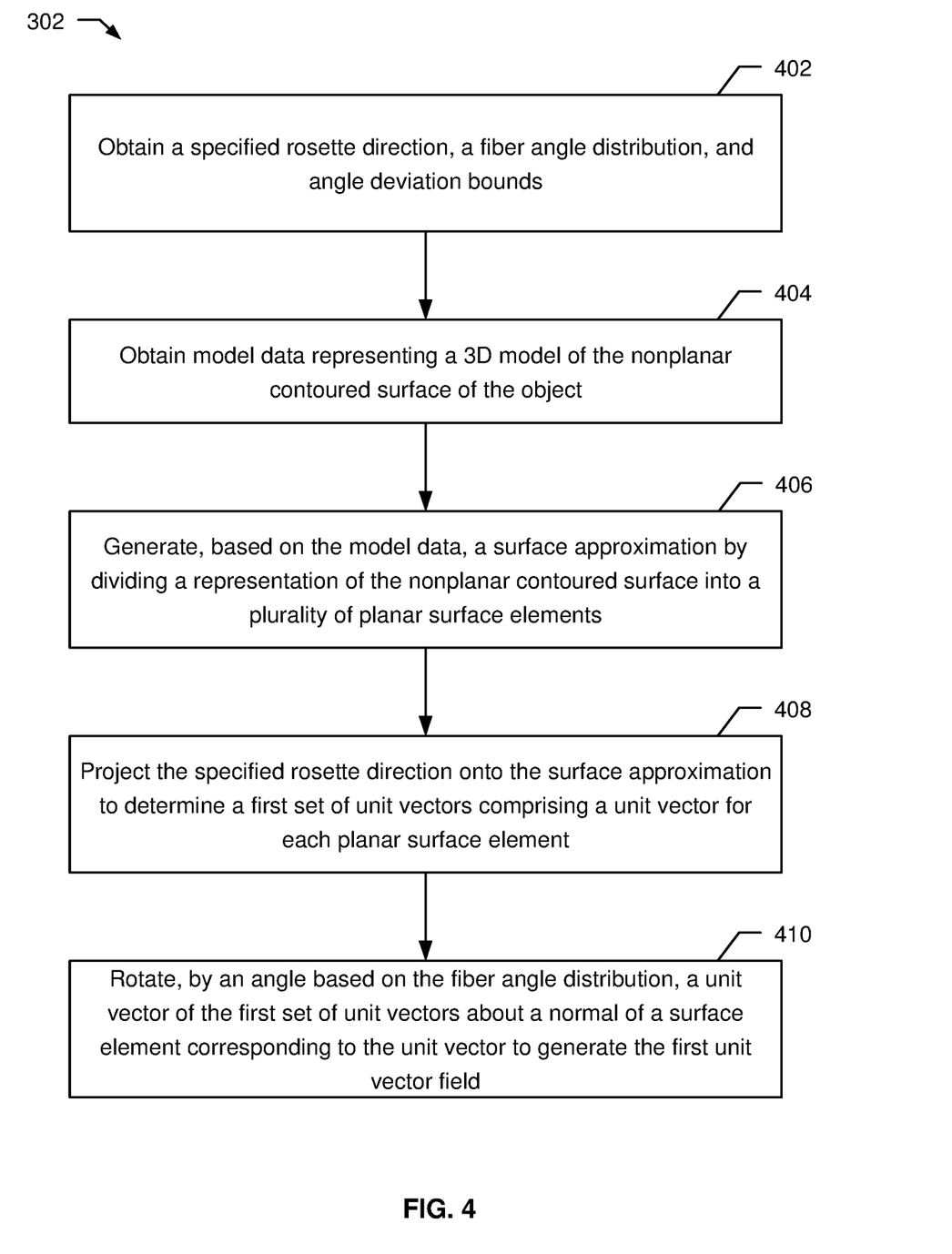
FIG. 4 is a flowchart that illustrates aspects of the method of planning fiber paths of FIG. 3 according to a particular implementation.

The method 300 includes, at block 302, determining a first unit vector field representing a first approximation of target directions to be followed by tow centerlines of the composite ply, where the first unit vector field is determined based on a specified rosette direction, a surface approximation of a nonplanar contoured surface of an object to be formed via the composite layup, and a fiber angle distribution. FIG. 4 illustrates aspects of determining the first unit vector field according to a particular implementation.

In the example illustrated in FIG. 4, determining the first unit vector field includes, at block 402, obtaining a specified rosette direction and a fiber angle distribution. To illustrate, the computing device 102 of FIG. 1 obtains the specified rosette direction 146 and the fiber angle distribution 148 from the modeling device 140. In some implementations, angle deviation bounds (e.g., the angle deviation bounds 150) are also obtained at block 402. The example of FIG. 4 continues, at block 404, with obtaining model data representing a 3D model of a nonplanar contoured surface of an object. To illustrate, the computing device 102 of FIG. 1 obtains the model data 152 representing the 3D model 142 of the nonplanar contoured surface 144 of the object 180 from the modeling device 140.

The example of FIG. 4 continues, at block 406, with generating, based on the model data, a surface approximation by dividing a representation of the nonplanar contoured surface into a plurality of planar surface elements. For example, the computing device 102 of FIG. 1 executes the surface approximation instructions 114 to generate the surface approximation 126, which includes the plurality of planar surface elements 128. FIG. 2 illustrates an example of a pair of the planar surface elements 128.

The example of FIG. 4 continues, at block 408, with projecting the specified rosette direction onto the surface approximation to determine a first set of unit vectors including a unit vector for each planar surface element. FIG. 2 illustrates an example of a specified rosette direction 146 projected onto the planar surface elements 128A and 128B and the resulting unit vectors 206A and 206B.

The example of FIG. 4 continues, at block 410, with rotating, by an angle based on the fiber angle distribution, a unit vector of the first set of unit vectors about a normal of a surface element corresponding to the unit vector to generate the first unit vector field. For example, as illustrated in the view 212 of FIG. 2, the unit vectors 214 are rotated around the normals 132 relative to the projected rosette direction unit vectors 206. In this example, the first unit vector field includes the unit vectors 214 of all of the planar surface elements 128 of the surface approximation 126 of the nonplanar contoured surface 144.

Figure 5:
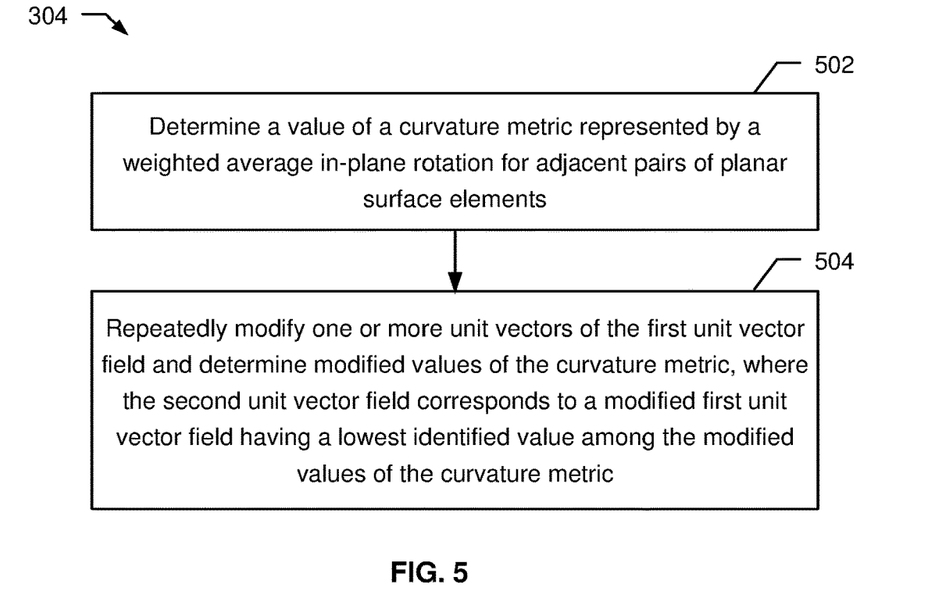
FIG. 5 is a flowchart that illustrates further aspects of the method of planning fiber paths of FIG. 3 according to a particular implementation.

Returning to FIG. 3, the method 300 also includes, at block 304, determining, based on specified angle deviation bounds and the first unit vector field, a second unit vector field representing a second approximation of the target directions, where the second approximation has reduced in-plane curvature relative to the first approximation. FIG. 5 illustrates aspects of determining the second unit vector field according to a particular implementation.

Figure 6:
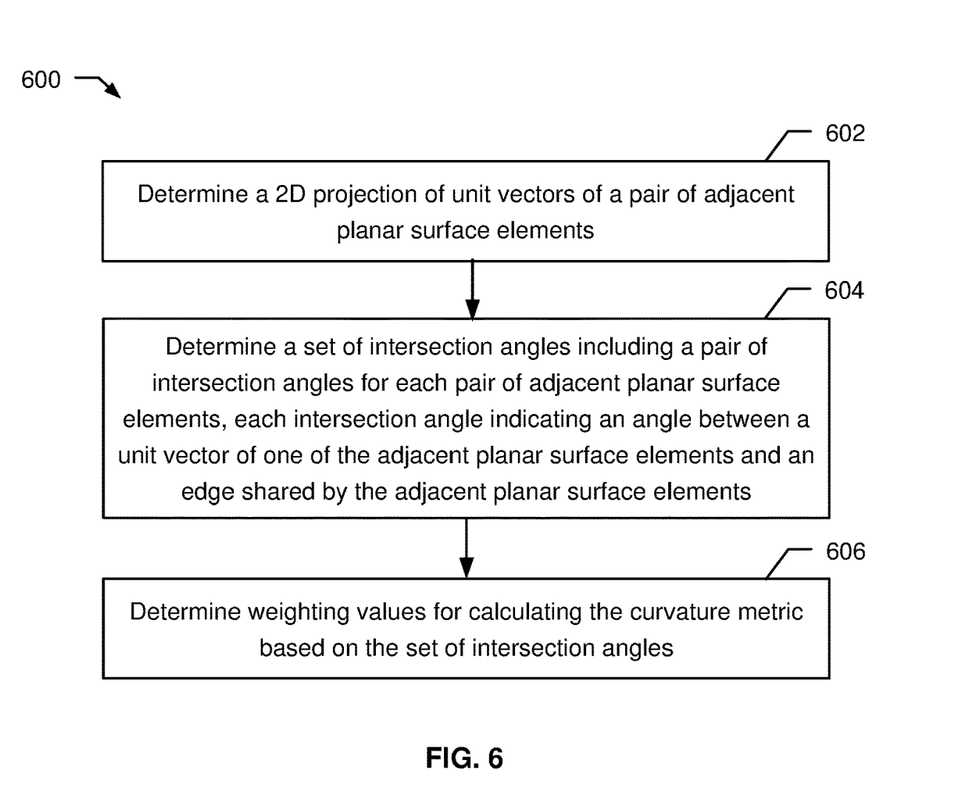
FIG. 6 is a flowchart that illustrates further aspects of the method of planning fiber paths of FIG. 3 according to a particular implementation.

In the example illustrated in FIG. 5, determining the second unit vector field includes, at block 502, determining a value of a curvature metric represented by a weighted average in-plane rotation for adjacent pairs of planar surface elements. For example, values of the curvature metric are calculated for various rotations of the unit vectors 130 around the normals 132 within limits specified by the angle deviation bounds 150, as described with reference to the views 216, 222A, and 222B of FIG. 2. In a particular aspect, weighting values for the curvature metric are determined based on intersection angles between the unit vectors (e.g., the transformed unit vectors 236) and a shared edge 250 between a pair of adjacent planar surface elements (e.g., the transformed elements 232). To illustrate, FIG. 6 is a flowchart that illustrates a method 600 of determining weighting values for calculating values of the curvature metric.

The method 600 includes, at block 602, determining a 2D projection of unit vectors of a pair of adjacent planar surface elements. For example, FIG. 2 illustrates a transform operation 228 to convert the planar surface elements 128 and unit vectors 130 from the 3D space represented by the axes 220 to elements 232 and vectors 236 in the 2D space represented by the axes 230.

The method 600 includes, at block 604, determining a set of intersection angles including a pair of intersection angles for each pair of adjacent planar surface elements. Each intersection angle indicates an angle between a unit vector of one of the adjacent planar surface elements and an edge shared by the adjacent planar surface elements. For example, as illustrated in FIG. 2, the angle $\alpha_k$ is an intersection angle between the unit vector 236B and the shared edge 250.

The method 600 includes, at block 606, determining the weighting values for calculating the curvature metric based on the set of intersection angles. For example, the weighting values, $w_{jk}$, can be determined using Equation 1 or Equation 2, above.

Returning to FIG. 5, the example of determining the second unit vector field in FIG. 5 further includes, at block 504, repeatedly modifying one or more unit vectors of the first unit vector field and determining modified values of the curvature metric. The second unit vector field corresponds to a modified first unit vector field having a lowest identified value among the modified values of the curvature metric. For example, one or more of the unit vectors 130 can be rotated further from or closer to the corresponding unit vector 214, resulting in modified values of the curvature metric. In some implementation, repeated calculations can be performed concurrently. For example, one or more matrices can be used to represent a plurality of different rotations of a unit vector, and the corresponding values of the curvature metric can be determined simultaneously or concurrently.

Returning to FIG. 3, the method 300 further includes, at block 306, planning a fiber placement head path for forming the composite ply of the composite layup based on the second unit vector field. For example, the fiber placement head path(s) 136 are determined based on the second unit vector field. In some implementations, local smoothing operation are performed on the second unit vector field to generate a third unit vector field. In such implementations, the third unit vector field (which is based on the second unit vector field) is used to determine the fiber placement head path(s) 136. For example, FIG. 7 illustrates aspects of local smoothing to determine the third unit vector field.

Figure 7:
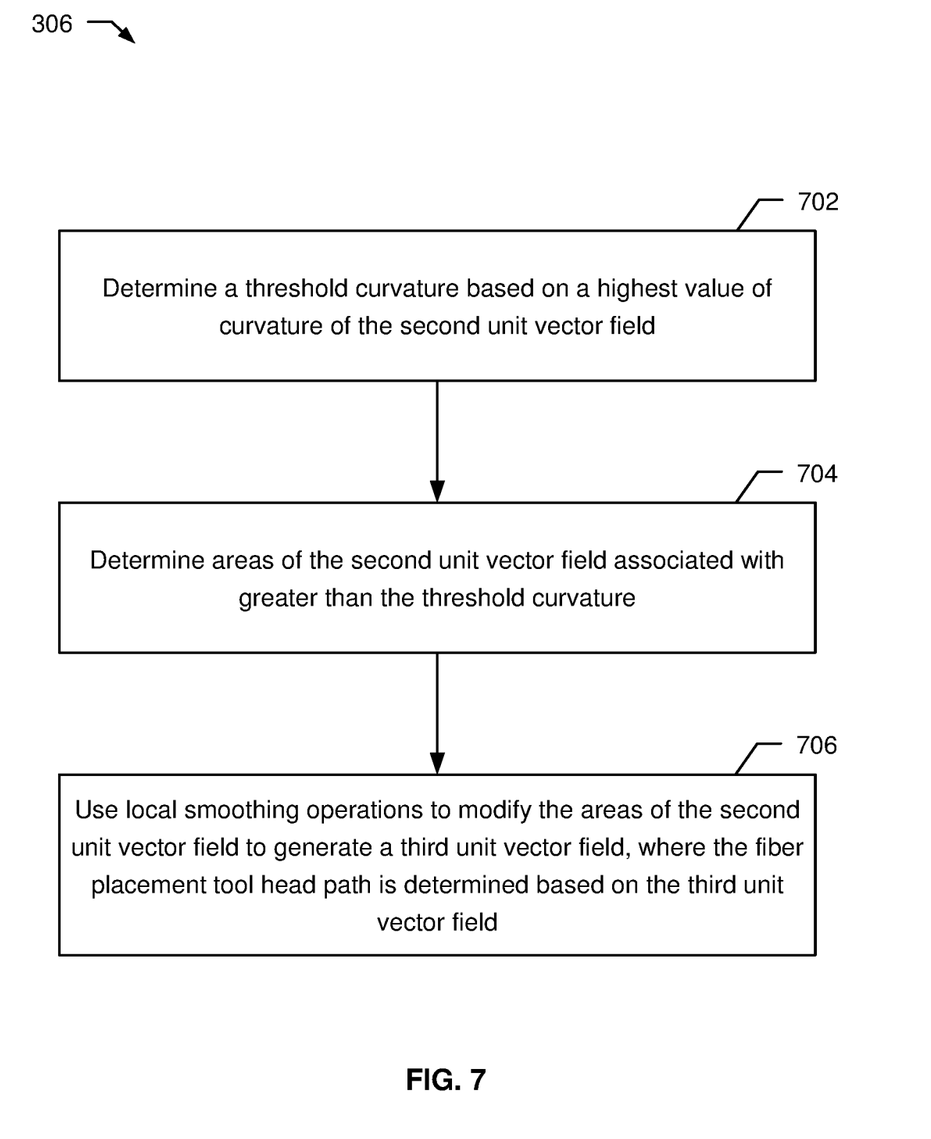
FIG. 7 is a flowchart that illustrates further aspects of the method of planning fiber paths of FIG. 3 according to a particular implementation.

The example illustrated in FIG. 7 includes, at block 702, determining a threshold curvature based on a highest value of curvature of the second unit vector field. For example, in a particular implementation, the threshold curvature is determined as a fraction or percentage of the highest value of the curvature metric, such 50%, 70%, or 90% of the highest value of the curvature metric.

The example illustrated in FIG. 7 also includes, at block 704, determining areas of the second unit vector field associated with greater curvature values than the threshold curvature. For example, pairs of adjacent planar surface elements having values of the curvature metric that exceed the threshold curvature are identified.

The example illustrated in FIG. 7 further includes, at block 706, using local smoothing operations to modify the areas of the second unit vector field to generate a third unit vector field. For example, the angle deviations of the pair of adjacent planar surface elements and of the neighboring planar surface elements are averaged to smooth the local curvature. The fiber placement head path is determined based on the third unit vector field.

Thus, the method 300 enables planning fiber paths for AFP manufacturing in a manner that reduces in-plane curvature of tows. Reducing the in-plane curvature of the tows reduces the occurrence of defects, which results in reduced demand for manual rework and increased fiber lay down speed. Path data representing planned fiber paths is provided to the AFP machine. The AFP machine implements the planned fiber paths using tows to produce the object.

In some implementations, the fiber placement head paths 136 correspond to or enable formation of a single ply 184 composite layup 182. The composite layup 182 include a plurality of composite plies 184. Accordingly, the operations described with reference to FIGS. 1-6 may be repeated to generate a set of fiber placement head paths 136 including one or more fiber placement head paths 136 for each composite ply 184. In some implementations, the fiber placement head paths 136 for multiple composite plies 184 are determined in parallel (e.g., simultaneously using different computing devices 102, different processors 104 of the computing device 102, different threads of the processors 104, or other parallel processing architectures).

In some implementations, the angle deviation bounds 150 are specified as angular offset limits, as in the example illustrated in FIG. 2. In other implementations, the angle deviation bounds 150 are constraints based on relative angles between the vector fields of all plies at each element, between neighboring plies (through a thickness of the composite layup 182) or based on mechanical properties of the resulting laminate at each element.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of planning fiber paths for a composite ply of a composite layup, the method comprising:

determining, by one or more processors, a first unit vector field representing a first approximation of target directions to be followed by tow centerlines of the composite ply, the first unit vector field determined based on a specified rosette direction, a surface approximation of a nonplanar contoured surface of an object to be formed via the composite layup, and a fiber angle distribution, wherein the surface approximation includes a plurality of planar surface elements approximating the nonplanar contoured surface;

determining, by the one or more processors, values of a product of a weighting value and a loss function for adjacent pairs of the planar surface elements for a plurality of first rotation angles relative to a first unit vector of the first unit vector field of a first planar surface of an adjacent pair of the adjacent pairs and a plurality of second rotation angles relative to a second unit vector of the first unit vector field of a second planar surface of the adjacent pair, wherein the plurality of first rotation angles and the plurality of second rotation angles are at or between angle deviation bounds;

for each adjacent pair of the adjacent pairs, rotating, by the one or more processors, the first unit vector relative to a normal of the first planar surface by a first rotation angle corresponding to a minimum of the values of the product and rotating the second unit vector relative to a normal of the second planar surface by a second rotation angle corresponding to the minimum of the values of the product to generate a second unit vector field representing a second approximation of the target directions, the second approximation having reduced in-plane curvature relative to the first approximation;

planning, by the one or more processors, a fiber placement head path for forming the composite ply of the composite layup based on the second unit vector field; and causing, by the one or more processors, one or more interfaces to send data representative of the fiber placement head path to an automatic fiber placement machine, wherein the automatic fiber placement machine manufactures the object based on the data.

2. The method of claim 1, further comprising:
obtaining, by the one or more processors, model data representing a three-dimensional (3D) model of the nonplanar contoured surface of the object; and
generating, by the one or more processors based on the model data, the surface approximation by dividing a representation of the nonplanar contoured surface into the plurality of planar surface elements.

3. The method of claim 1, wherein determining the first unit vector field comprises:
projecting the specified rosette direction onto the surface approximation to determine a first set of unit vectors comprising a unit vector for each planar surface element; and
rotating, by an angle based on the fiber angle distribution, a unit vector of the first set of unit vectors about a normal of a surface element corresponding to the unit vector to generate the first unit vector field.

4. The method of claim 1, further comprising for each first rotation angle and second rotation angle of each adjacent pair determining, by the one or more processors, an intersection angle of a projection of the first unit vector rotated by the first rotation angle relative to a normal of the first planar surface to a two-dimensional space with a projection of the second unit vector rotated by the second rotation angle relative to a normal of the second planar surface to the two-dimensional space, wherein the loss function is based on the intersection angle.

5. The method of claim 1, further comprising, for each first rotation angle and second rotation angle of each adjacent pair, determining, by the one or more processors, a first angle of a projection of the first unit vector rotated by the first rotation angle relative to a normal of the first planar surface to a two-dimensional space with a projection of a common edge of the adjacent pair in the two-dimensional space and a second angle of a projection of the second unit vector rotated by the second rotation angle relative to a normal of the second planar surface to the two-dimensional space with the projection of the common edge, wherein the weighting value is a function of the first angle and the second angle.

6. The method of claim 5, wherein the weighting values are further based on a tuning value.

7. The method of claim 1, wherein the loss function for an adjacent pair is a quadratic loss function of an approximation of an in-plane curvature across a common edge.

8. The method of claim 1, wherein the loss function for an adjacent pair is a trigonometric loss function of an approximation of an in-plane curvature across a common edge.

9. The method of claim 1, further comprising:
determining, by the one or more processors, areas of the second unit vector field associated with greater than a threshold curvature; and
using local smoothing operations to modify the second unit vector field.

10. The method of claim 9, further comprising determining the threshold curvature based on a highest value of curvature of the second unit vector field.

11. A computer-readable storage device storing instructions that are executable by one or more processors to cause the one or more processors to perform operations comprising:

determining a first unit vector field representing a first approximation of target directions to be followed by tow centerlines of a composite ply, the first unit vector field determined a specified rosette direction, a surface approximation of a nonplanar contoured surface of an object to be formed via a composite layup, and a fiber angle distribution, wherein the surface approximation includes a plurality of planar surface elements approximating the nonplanar contoured surface;
determining values of a product of a weighting value and a loss function for adjacent pairs of the planar surface elements for a plurality of first rotation angles relative to a first unit vector of the first unit vector field of a first planar surface of an adjacent pair of the adjacent pairs and a plurality of second rotation angles relative to a second unit vector of the first unit vector field of a second planar surface of the adjacent pair, wherein the plurality of first rotation angles and the plurality of second rotation angles are at or between angle deviation bounds;
for each adjacent pair of the adjacent pairs, rotating the first unit vector relative to a normal of the first planar surface by a first rotation angle corresponding to a minimum of the values of the product and rotating the second unit vector relative to a normal of the second planar surface by a second rotation angle corresponding to the minimum of the values of the product to generate a second unit vector field representing a second approximation of the target directions, the second approximation having reduced in-plane curvature relative to the first approximation;
planning a fiber placement head path for forming the composite ply of the composite layup based on the second unit vector field; and
sending, via one or more interfaces, data representative of the fiber placement head path to an automatic fiber placement machine, wherein the automatic fiber placement machine manufactures the object based on the data.

12. The computer-readable storage device of claim 11, wherein the operations further comprise:
obtaining model data representing a three-dimensional (3D) model of the nonplanar contoured surface of the object; and
generating the surface approximation based on the 3D model by dividing a representation of the nonplanar contoured surface into the plurality of planar surface elements.

13. The computer-readable storage device of claim 11, wherein determining the first unit vector field comprises:
projecting the specified rosette direction onto the surface approximation to determine a first set of unit vectors comprising a unit vector for each planar surface element; and
rotating, by an angle based on the fiber angle distribution, a unit vector of the first set of unit vectors about a normal of a surface element corresponding to the unit vector to generate the first unit vector field.

14. The computer-readable storage device of claim 11, wherein the operations further comprise for each first rotation angle and second rotation angle of each adjacent pair determining an intersection angle of a projection of the first unit vector rotated by the first rotation angle relative to a normal of the first planar surface to a two-dimensional space with a projection of the second unit vector rotated by the second rotation angle relative to a normal of the second planar surface to the two-dimensional space, wherein the loss function is based on the intersection angle.

15. The computer-readable storage device of claim 11, wherein the operations further comprise, for each first rotation angle and second rotation angle of each adjacent pair, determining a first angle of a projection to a two-dimensional space of the first unit vector rotated by the first rotation angle relative to a normal of the first planar surface with a projection of a common edge of the adjacent pair in the two-dimensional space and a second angle of a projection to the two-dimensional space of the second unit vector rotated by the second rotation angle relative to a normal of the second planar surface with the projection of the common edge, wherein the weighting value is a function of the first angle and the second angle.

16. The computer-readable storage device of claim 11, wherein the loss function for an adjacent pair is a quadratic loss function of an approximation of an in-plane curvature across a common edge.

17. The computer-readable storage device of claim 11, wherein the operations further comprise:
determining areas of the second unit vector field associated with greater than a threshold curvature; and
using local smoothing operations to modify the second unit vector field.

18. The computer-readable storage device of claim 17, wherein the operations further comprise determining the threshold curvature based on a highest value of curvature of the second unit vector field.

19. A system for planning fiber paths for a composite ply of a composite layup, the system comprising:
a computing system comprising one or more processors and one or more memory devices storing instructions that are executable by the one or more processors to cause the one or more processors to:
determining a first unit vector field representing a first approximation of target directions to be followed by tow centerlines of the composite ply, the first unit vector field determined based on a specified rosette direction, a surface approximation of a nonplanar contoured surface of an object to be formed via the composite layup, and a fiber angle distribution, wherein the surface approximation includes a plurality of planar surface elements approximating the nonplanar contoured surface;
determine values of a product of a weighting value and a loss function for adjacent pairs of the planar surface elements for a plurality of first rotation angles relative to a first unit vector of the first unit vector field of a first planar surface of an adjacent pair of the adjacent pairs and a plurality of second rotation angles relative to a second unit vector of the first unit vector field of a second planar surface of the adjacent pair, wherein the plurality of first rotation angles and the plurality of second rotation angles are at or between angle deviation bounds;
for each adjacent pair of the adjacent pairs, rotate the first unit vector relative to a normal of the first planar surface by a first rotation angle corresponding to a minimum of the values of the product and rotate the second unit vector relative to a normal of the second planar surface by a second rotation angle corresponding to the minimum of the values of the product to generate a second unit vector field representing a second approximation of the target directions, the second approximation having reduced in-plane curvature relative to the first approximation;
plan a fiber placement head path for forming the composite ply of the composite layup based on the second unit vector field; and
an automatic fiber placement machine, wherein the automatic fiber placement machine receives data representative of the fiber placement head path from the computing system, and wherein the automatic fiber placement machine manufactures the object based on the data.

20. The system of claim 19, wherein the instructions are further executable by the one or more processors to:
determine areas of the second unit vector filed associated with greater than a threshold curvature; and
use local smoothing operations to modify the second unit vector field.

* * * * *

UNITED STATES PATENT AND TRADEMARK OFFICE
CERTIFICATE OF CORRECTION

| | | |
|---|---|---|
| PATENT NO. | : 11,436,390 B2 | Page 1 of 1 |
| APPLICATION NO. | : 16/904954 | |
| DATED | : September 6, 2022 | |
| INVENTOR(S) | : Adriana Willempje Blom-Schieber, Troy Winfree and Jeffrey David Poskin | |

It is certified that error appears in the above-identified patent and that said Letters Patent is hereby corrected as shown below:

In the Claims

Claim 11, Column 16, Line 4, after "determined" insert --based on--.

Signed and Sealed this
Sixth Day of December, 2022

Katherine Kelly Vidal
*Director of the United States Patent and Trademark Office*